United States Patent [19]

Schmid et al.

[11] Patent Number: 4,625,826

[45] Date of Patent: Dec. 2, 1986

[54] VIBRATION ISOLATING MOUNTINGS FOR PUSH-PULL CABLES COUPLED TO VIBRATING CONTROL ARMS

[75] Inventors: Steven L. Schmid, Agency; J. Clark Fickle; Keith E. Hill, both of Ottumwa, all of Iowa

[73] Assignee: Deere & Company, Moline, Ill.

[21] Appl. No.: 740,785

[22] Filed: Jun. 3, 1985

[51] Int. Cl.⁴ .............................................. B62D 11/04
[52] U.S. Cl. ..................................... 180/315; 180/333
[58] Field of Search .............. 180/315, 333, 335, 6.48; 74/471 R, 473 R

[56] References Cited

U.S. PATENT DOCUMENTS

| | | | |
|---|---|---|---|
| 3,563,109 | 2/1971 | Glass et al. | 74/470 |
| 3,792,744 | 2/1974 | Gray | 180/6.48 |
| 3,885,448 | 5/1975 | Beals et al. | 180/315 |
| 3,902,567 | 9/1975 | Pekar, Jr. | 180/70 R |
| 4,299,137 | 11/1981 | Malecha | 180/315 |
| 4,321,980 | 3/1982 | Nissen | 180/333 |

Primary Examiner—Richard A. Bertsch

[57] ABSTRACT

A hydrostatic drive for a windrower includes wheel motors having speed control arms movable between "hi" and "lo" speed stops by means of a pair of push-pull cables coupled between the control arms and a speed control lever. The cables have housings mounted to the motor control arms so as to isolate the cable from noise and other vibrations induced in the control arms. The cable housings are also mounted to the frame by a shock absorber load assembly which acts through the cable housing to resiliently bias the control arms against their respective stops and to further isolate the cable from vibrations.

10 Claims, 5 Drawing Figures

VIBRATION ISOLATING MOUNTINGS FOR PUSH-PULL CABLES COUPLED TO VIBRATING CONTROL ARMS

BACKGROUND OF THE INVENTION

The present invention relates to the reduction of noise within a vehicle cab and more specifically relates to isolating the inside of a cab from noise generated by hydrostatic wheel drive motors.

It is known, for example, to use a hand lever for controlling the speed of a pair of wheel motors of a hydrostatically driven windrower through the medium of a pair of push-pull cables respectively linked between the lever and respective speed control arms of the motors. In this known control, the core of each cable has opposite ends fixed to the lever and a respective motor speed control arm while the housing or sheath of the core is anchored to the vehicle frame. This known cable arrangement is not entirely satisfactory since fluid pulsations generated by the motors result in vibrations being induced in the control arms and then transmitted through the cable cores to the interior of the cab. Also, vibrations sometimes cause the motor control arms to migrate away from respective stops delimiting the "hi-lo" operating positions thereof and this results in a very disturbing growling type noise being produced by the motors.

SUMMARY OF THE INVENTION

According to the present invention there is provided a novel control arrangement for diminishing the transmission of noise from a cable-controlled device, which generates noise during operation, to a vehicle cab.

It is an object of the invention to isolate a control lever, located in a vehicle cab, from noise generated by a device having a control arm coupled to the lever by a push-pull cable.

A more specific object of the invention is to use elastomeric connectors between a device control arm and a cable housing to isolate the cable from vibrations induced in the control arm, with the cable core having opposite ends respectively coupled to the lever and anchored to the vehicle frame adjacent the control arm and with the cable housing being anchored to the frame at a location adjacent the control lever.

Yet, a more specific object of the invention is to provide a push-pull cable arrangement as described in a previous object wherein elastomeric connectors are used in anchoring the cable housing to the frame.

Another specific object is to construct the elastomeric connectors of the immediately preceding object such that they act to establish a biasing force on the device control arm when the control lever is swung in opposite directions from a central position to respective operating positions to thereby hold the device control arm in corresponding operating positions.

These and other objects, features and advantages of the present invention will become apparent to those skilled in the art from the description which follows and from the drawing.

DESCRIPTION OF THE PREFERRED EMBODIMENT

Figure 1:
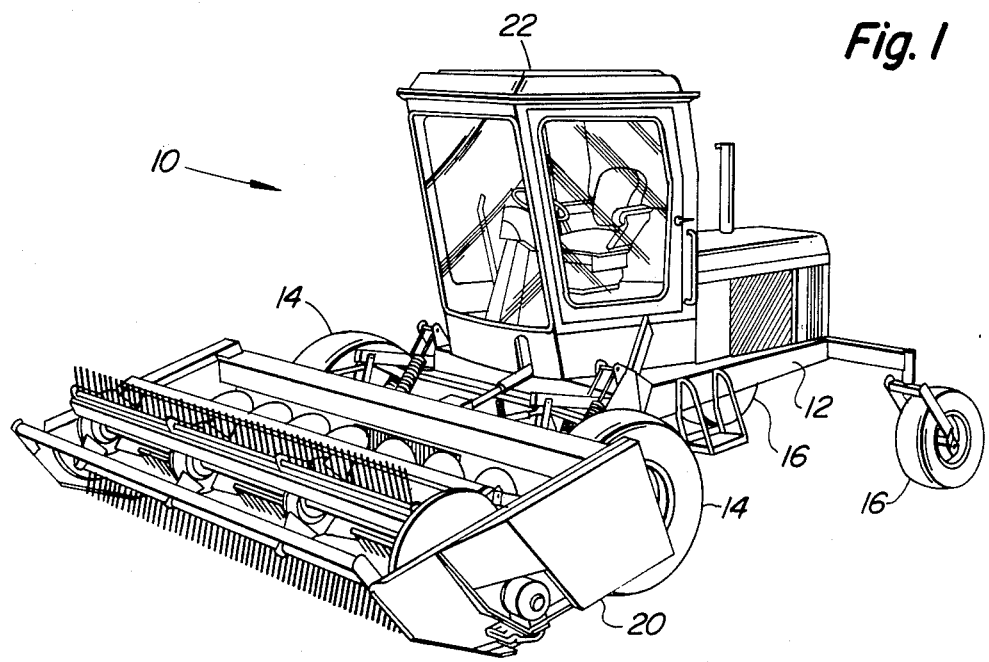
FIG. 1 is a left front perspective view of a self-propelled windrower which utilizes a hydrostatic drive transmission with which the present invention is particularly adapted for use.
Figure 2:
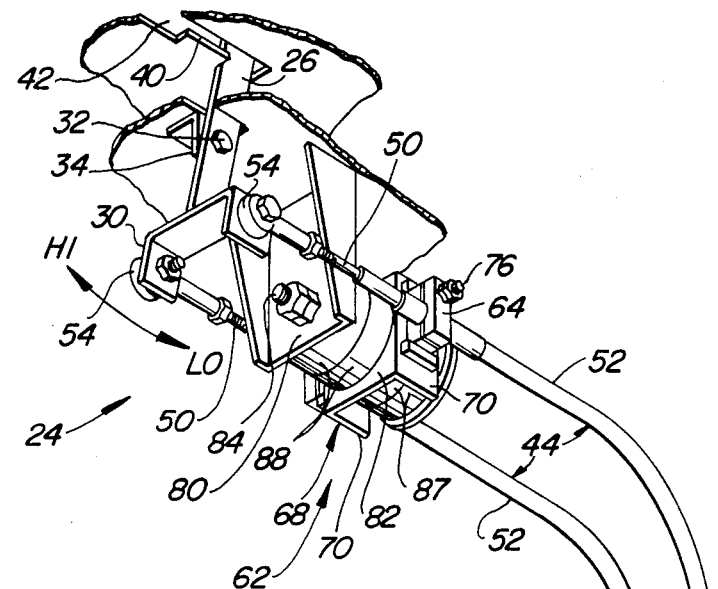
FIG. 2 is a schematic view showing the push-pull cable arrangement of the present invention, embodied in a hydrostatic drive motor control system.
Figure 2:
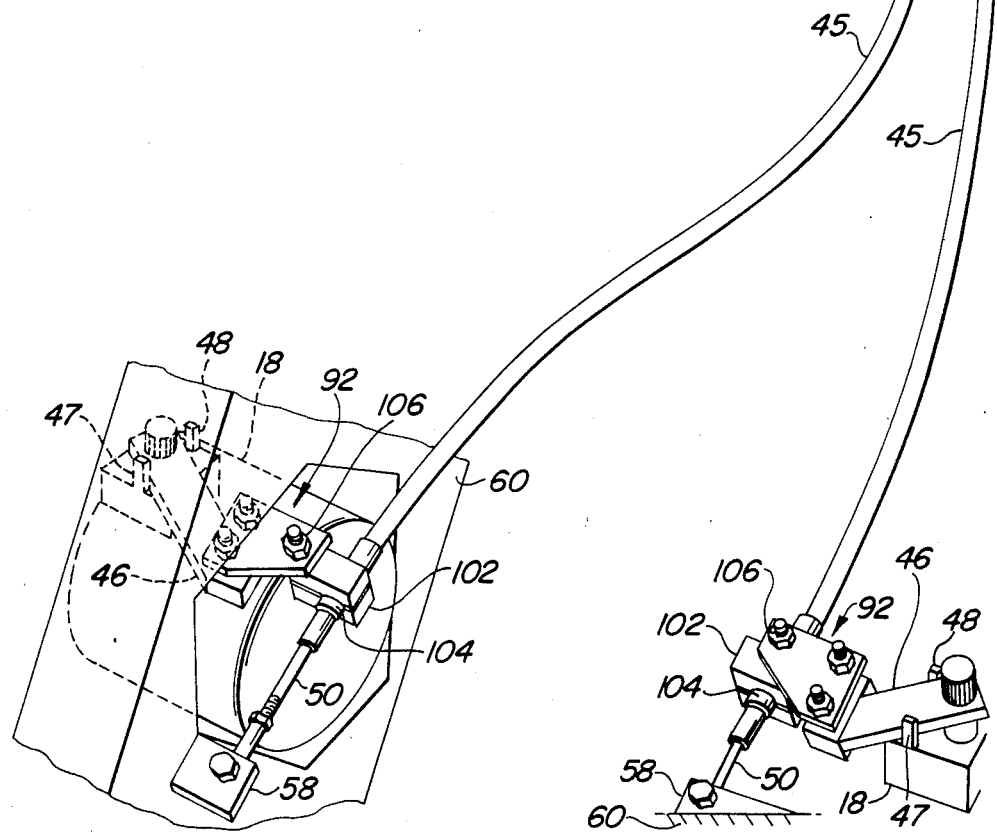
Figure 4:
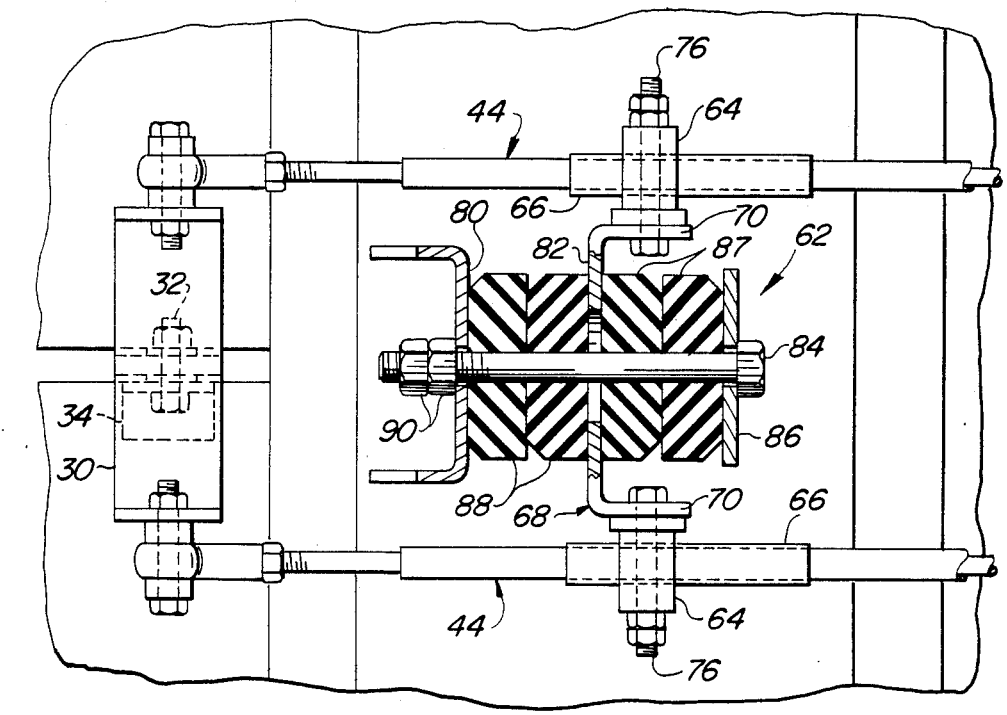
FIG. 4 is a bottom view of the structure shown in FIG. 3, but with the shock absorber load assembly being shown in longitudinal cross section.
Figure 5:
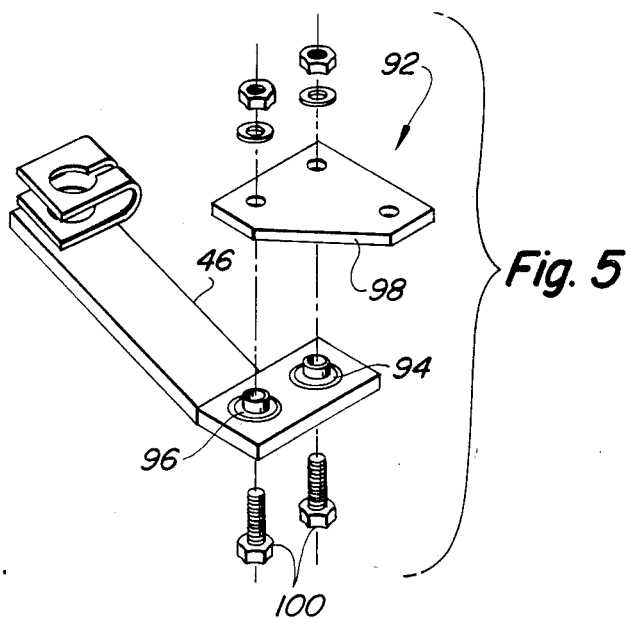
FIG. 5 is an exploded view showing the connection between the cable housing support plate and motor control arm.

Referring now to FIG. 1, there is shown a self-propelled windrower 10. The windrower 10 has a main frame 12 supported on a pair of front drive wheels 14 and a pair of rear castered wheels 16. The drive wheels 14 are driven by a hydrostatic drive system including a pair of variable speed motors 18, partially shown in FIG. 2, respectively coupled to the wheels 14. A platform 20 is suspended from the forward end of the frame 12. Located on the forward portion of the frame 12 is an operator's cab 22 which contains all of the controls for the windrower.

Referring now to FIGS. 2–5 there is shown a control system 24 for placing the motors 18 in either a high speed, "hi", transport condition or a low speed, "lo", working condition. Specifically, there is shown a manually-operated "hi-lo" shift lever 26 which has an upper end portion defined by a hand grip (not shown) and a lower end defined by an inverted U-shaped strap 30. The lever 26 is mounted for fore-and-aft pivoting movement about a horizontal transverse axis defined by a pin 32 extending through the lever between its opposite ends and coupling it to a support structure 34 located beneath a floor 36 of the cab. The floor 36 contains an opening 38 through which the lever extends. The lever is movable between "hi" and "lo" positions and held therein by an offset portion 40 of a shift gate 42.

A pair of push-pull cables 44 is coupled and each includes a bend section 45 located between the lever 26 and a pair of speed control arms 46 of the motors 18 so as to transmit motion of the lever to each control arm 42 and move the latter against respective stops 47 and 48 which delimit corresponding "hi" and "lo" positions of the arms. Specifically, each cable 44 includes a core 50 slidably encased in a housing or sheath 52. A connector eye 54 is coupled to one end of each core 50 and is secured, as at 56, to a respective leg of the strap 30 forming the bottom of the "hi-lo" shift lever 26. The opposite ends of the cores 50 are respectively anchored to a pair of tabs 58 located on depending frame portions 60 located at opposite forward end locations of the frame 12 and carrying the motors 18, the tabs 58 being located downwardly beyond but adjacent to the motors.

The cable housings 52 terminate short of the opposite ends of the respective cores 50. The ends of the housings 52 which are closest to the shift lever 26 are anchored to the frame 12 by a shock absorber load assembly 62. Specifically, the assembly 62 includes a pair of two-piece clamps 64 respectively received about armored sections 66 of the pair of housings 52. A U-shaped cable mounting bracket or plate 68 has opposite fore-and-aft extending legs 70 and fixed to an outer surface of each of the legs are upper and lower vertically spaced retaining tabs 72 and 74. The pairs of clamps 64 respectively fit snugly between the set of tabs 72 and 74 provided on the legs 70 and each clamp 64 includes a clamp bolt 76 which extends through the two pieces of the clamp and one of the bracket legs 70. Fixed to the cab floor 36 is a support bracket 78 including a vertical transverse plate portion 80 which extends parallel to a vertical bight portion 82 of the U-shaped bracket 68. A fore-and-aft extending bolt 84 carries a circular compression plate 86 at its head end and the bolt is received in fore-and-aft aligned holes located in the plate and bight portions 80 and 82. Received on the bolt 84 between the compression plate 86 and the bight portion 82 is a first pair of cylindrical, elastomeric cushions 87 and received on the bolt between the bight portion 82 and the vertical plate portion 80 is a second pair of cylindrical elastomeric cushions 89. A nut and jam nut assembly 90 is received on a threaded forward end of the bolt and is adjustable so as to vary the biasing force acting on the motor control arms 46 in a manner set forth in more detail below.

The ends of the cable housings 52 which are respectively closest to the motor control arms 46 are secured to these arms by respective vibration isolator assemblies 92. As can best be seen in FIG. 5, each of the assemblies 92 includes a pair of isolators 94 and 96 respectively mounted in a pair of spaced holes provided in an end of a respective motor control arm 46, the isolators each including inner and outer steel sleeves sandwiching an elastomeric core. The holes carrying the isolators 94 and 96 are substantially aligned with the direction of movement of the cable housing 52 during actuation of the arm 46. A triangular plate 98 is bolted to each arm 46 by a pair of bolts 100 which extend through the inner sleeves of the associated isolators 94 and 96. A two-piece clamp 102 is received about an armored section 104 of each cable housing 52 and includes a clamp bolt 106 which extends through the clamp pieces and an associated one of the triangular plates 98.

Figure 3:
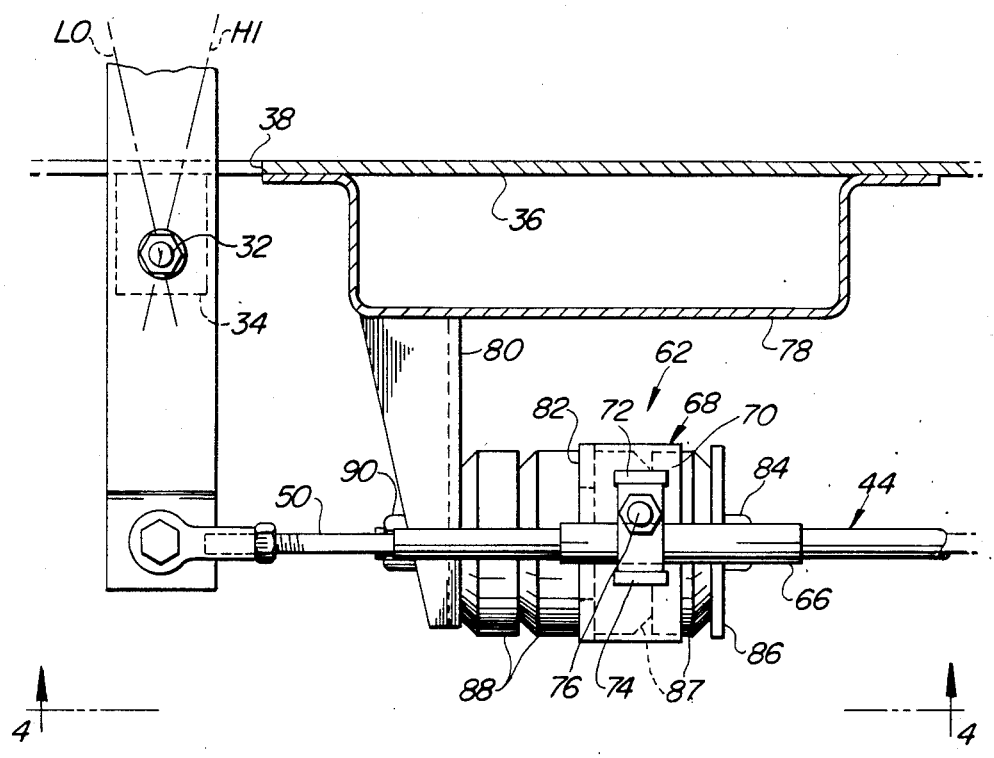
FIG. 3 is a left side elevational view showing the respective connections between the "hi-lo" shift lever and the cable core and between the cable housing or sheath and the vehicle cab.

In operation, assuming the speed control lever 26 to be initially in an intermediate position between its "hi" and "lo" positions, as shown in FIG. 3, each of the shock absorber load assemblies 62 will be in a neutral condition wherein preload forces exerted on the cable mounting bracket 68 by the sets or pairs of elastomeric cushions 86 and 88 will be balanced. Also, each cable core 50 will be positioned by the lever 26 so that the associated core 52 holds its associated motor control arm 46 in a position intermediate the "hi" and "lo" stops 47 and 48.

If it is then desired to ready the windrower for transport, the lever 26 is pulled back into its "hi" position in the rearward end of the shift gate 42. This lever movement will cause each of the cable cores 50 to be pulled leftwardly as viewed in FIG. 3 and thereby deflects the cable housings 52 leftwardly so as to initially move the arms 46 against respective "hi" stops 47 and then to act through the clamps 64 and bracket 68 to further compress the pair of elastomeric cushions 88 of the shock absorber load assembly 62. Thus, the compressed cushions 88 act to resiliently load or bias the arms 46 against their stops 47 so as to ensure that they do not drift from their operating position during operation. Also, the compressed cushions 88 serve to accommodate wear in the various connections between the cable housings 52 and the bracket 78 and between the housings 52 and the arms 46.

If it is then desired to place the windrower in condition for field operation, the lever 26 is moved forwardly to its "lo" position. This forward movement causes the cable cores 50 to be pushed rearwardly so as to deflect the cable housings 52 rearwardly to first unload the pairs of cushions 88, then move the arms 46 from their "hi" stops 47 to their "lo" stops 48 and then to compress the pairs of cushions 87 so that the arms 46 are resiliently biased into position.

The amount of loading exerted on the arms 46 when the lever 26 is in one or the other of its "hi" and "lo" positions may be varied by adjustment of the nut and jam nut assembly 90 on the end of the bolt 84 of the shock absorber load assembly 62.

It will be appreciated that noise and other vibrations induced in the motor control arms 46 will be dampened by the associated isolators 94 and 96 so that they are not transmitted to the cable housings 52 and in this way are kept from being transmitted to the cores 50 and the control lever 26. Vibrations which are induced in the frame 12 are absorbed or dampened by the shock absorber load assembly 62. Thus, the push-pull cables 44 are mounted between the lever 26 and the motor control arms 46 in such a way as to at least significantly reduce the amount of noise generated in the cab due to motor and other vibrations traveling along the cables to the control lever 26.

We claim:

1. In a control system including a controlled device which generates noise vibrations during operation and includes a swingable control arm, a pivotally mounted, manually operable control lever, and a push-pull cable including a bend located between and being coupled between an output end of the lever and the control arm for transmitting pivotal motion of the lever to the control arm, the improvement comprising: said cable having an elongate core having one end coupled to the lever and another end anchored at a location adjacent the control arm; a sheath slidably encasing said core; said sheath being shorter than said core; a first coupling means anchoring a first end of said sheath at a location adjacent the output end of the lever, and a second coupling means including a shock absorber means connecting another end of the sheath to the control arm so as to diminish the transmission of noise vibrations to the cable, and hence, to the control lever.

2. The control system defined in claim 1 wherein said first coupling means includes further shock absorber means for dampening vibrations so as to prevent their transmission to the lever via the cable.

3. The control system defined in claim 1 wherein said first coupling means includes biasing means for urging the motor control arm toward desired operating positions in response to operation of the lever between desired operating positions.

4. The control system defined in claim 3 wherein said first coupling means includes an anchor bolt extending through a fixed support and having a plate held on one end by a nut; said biasing means including at least two elastomeric members slidably received on said bolt so as to be sandwiched between the plate and the support; and a mounting plate slidably received on the bolt between the two elastomeric members and fixed to said cable sheath whereby movement of the sheath from a centered location along the core during actuation of the control arm is resisted by one or the other of the elastomeric members with the resistance being adjustable by turning the nut one way or the other on the bolt so as to increase or decrease the preload in the elastomeric members.

5. The control system defined in claim 4 wherein there are four elastomeric members with two being located on each side of the mounting plate.

6. In a control system for controlling the speed of a pair of vehicle drive motors forming part of a hydrostatic drive system and including a pair of speed control arms pivotable between "hi" and "lo" speed stops, a "hi-lo" speed control lever pivotable between "hi" and "lo" speed positions and a pair of push-pull cables each coupled to the speed control lever and respectively coupled to the pair of speed control arms, and with the cables including a bend between opposite ends thereof, the improvement comprising: each of the cables including a core having a first end connected to the control lever and the pair of cores having second ends anchored at respective locations adjacent the pair of speed control arms; each of the cables including a sheath slidably receiving one of the cores; a first coupling means anchoring each sheath at a location adjacent the control lever; and a second and third coupling means each including shock absorbing means and respectively coupling the sheath to said pair of control arms such that the vibrations generated by the drive motors are substantially isolated from the sheaths and, hence, the cable cores.

7. The control system defined in claim 6 wherein said first coupling means includes further shock absorbing means for dampening vibrations so as to prevent their transmission to the lever via the core.

8. The control system defined in claim 6 wherein said first coupling means includes biasing means for acting through the pair of cable sheaths for respectively urging the pair of motor control arms against their "hi" and "lo" speed stops in response to placement of the control lever in its corresponding "hi" and "lo" speed positions.

9. The control system defined in claim 8 wherein said first coupling means includes an anchor bolt extending through a fixed support and having a plate held on one end by a nut; said biasing means including at least two elastomeric members slidably received on said bolt so as to be sandwiched between the plate and the support; and a mounting plate slidably received on the bolt between the two elastomeric members and having opposite ends respectively fixed to the pair of cable sheaths, whereby movement of the sheath from a centered location along the core during actuation of the control arm is resisted by one or the other of the elastomeric members with the resistance being adjustable by turning the nut one way or the other on the bolt so as to increase or decrease the preload in the elastomeric members.

10. The control system defined in claim 9 wherein there are four elastomeric members with two being located on each side of the mounting plate.

* * * * *